United States Patent
Liu et al.

(10) Patent No.: US 7,680,150 B2
(45) Date of Patent: Mar. 16, 2010

(54) VIRTUAL CLEAR CHANNEL AVOIDANCE (CCA) MECHANISM FOR WIRELESS COMMUNICATIONS

(75) Inventors: Yonghe Liu, Dallas, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1737 days.

(21) Appl. No.: 10/823,102

(22) Filed: Apr. 13, 2004

(65) Prior Publication Data
US 2005/0226270 A1    Oct. 13, 2005

(51) Int. Cl.
*H04J 3/16* (2006.01)

(52) U.S. Cl. ............... 370/469; 370/459; 370/461; 370/474

(58) Field of Classification Search ........... 370/445, 370/447, 448, 461, 322, 338, 348, 469, 465, 370/464, 276, 277, 279, 275, 278, 459, 474
See application file for complete search history.

(56) References Cited

U.S. PATENT DOCUMENTS

| | | | | |
|---|---|---|---|---|
| 4,815,134 A | * | 3/1989 | Picone et al. | 704/222 |
| 5,774,459 A | * | 6/1998 | Charrat | 370/310 |
| 6,996,074 B2 | * | 2/2006 | Garcia-Luna-Aceves et al. | 370/278 |
| 7,016,651 B1 | * | 3/2006 | Narasimhan | 455/67.11 |
| 7,046,651 B2 | * | 5/2006 | Terry | 370/338 |
| 7,423,968 B2 | * | 9/2008 | Stephens | 370/235 |
| 2002/0120740 A1 | * | 8/2002 | Ho et al. | 709/225 |
| 2003/0063598 A1 | * | 4/2003 | Huo | 370/349 |
| 2003/0189948 A1 | * | 10/2003 | Sashihara | 370/445 |
| 2004/0095911 A1 | * | 5/2004 | Benveniste et al. | 370/338 |
| 2004/0136390 A1 | * | 7/2004 | Kim et al. | 370/412 |
| 2005/0025143 A1 | * | 2/2005 | Chen et al. | 370/389 |

* cited by examiner

*Primary Examiner*—Pankaj Kumar
*Assistant Examiner*—Lonnie Sweet
(74) *Attorney, Agent, or Firm*—Steven A. Shaw; W. James Brady; Frederick J. Telecky, Jr.

(57) ABSTRACT

An arrangement avoids contention on a communication medium among devices including at least a transmitter and a receiver. The arrangement involves a first portion configured to instruct a receiver to indicate that the communication medium is busy for a time period substantially longer than an actual frame transmission period being sent from the transmitter to the receiver, and a second portion configured to prohibit the receiver from transmitting on the communication medium during the time period.

17 Claims, 3 Drawing Sheets

VIRTUAL CLEAR CHANNEL AVOIDANCE (CCA) MECHANISM FOR WIRELESS COMMUNICATIONS

BACKGROUND OF THE INVENTION

1. Field of the Invention

The invention generally relates to enhancements to data communication techniques. More particularly, the invention relates to arrangements for resolving contention and avoiding collisions, especially in a wireless data communication scenario such as those governed by IEEE 802.11x standards.

2. Related Art

Most wireless local area networks (WLANs) follow standards adopted by the Institute of Electrical and Electronic Engineers (IEEE). IEEE 802.11 refers to a group of specifications for WLANs. The initial IEEE 802.11 WLAN standard ("IEEE 802.11-1997") was published in 1997, and was updated in 1999 ("IEEE 802.11-1999"). IEEE 802.11 defines specifications for baseband direct sequence spread spectrum (DSSS), frequency hopping spread spectrum (FHSS), and infrared communication. Sub-standards of the 802.11 standard include 802.11c (documentation of MAC procedures), 802.11d (additional regulatory domains), 302.11e (quality of service, QoS), 802.11f (inter access point protocol, IAPP), 802.11h (Dynamic Channel Selection and Transmission Power Control) and 802.11i (Authentication and Security).

In addition, two mutually incompatible standards (commonly, "wi-fi" or "wireless fidelity") evolved: IEEE 802.11a (see "IEEE Std 802.11a-1999"), communicating with orthogonal frequency division multiplexing (OFDM) at 5 (maximum 54) megabits per second (Mbps) and 5 GHz; and IEEE 802.11b, communicating in DSSS at 11 Mbps and 2.4 GHz. Furthermore, IEEE 802.11g, being compatible with IEEE 802.11b, also operates at 2.4 GHz but at a higher speed of 54 Mbps over short distances.

In the Open Systems Interconnection (OSI) seven-layer protocol layer model, adopted by organizations working on IEEE 802 LAN standards, the lowest two layers are the physical layer (PHY layer 7) and the data link layer (layer 6). The IEEE 802 reference model breaks the data link layer (layer 6) into two sub-layers: the logical link control (LLC) sub-layer, which lies atop the medium access control (MAC) sub-layer.

Conventionally (see, for example, William Stallings, *Data and Computer Communications*, Fifth Edition, Prentice-Hall, Inc., 1997), the physical layer has performed such low-level functions as encoding and decoding signals, processing preambles for synchronization, and actually transmitting and receiving bits carried by a communications medium. Above the physical layer, the data link layer has traditionally performed such functions as assembling and disassembling address and error detection components of transmitted frames, providing access to layers higher than the data link layer, performing flow control and error control, and, significantly, governing access to the LAN transmission medium (see p. 365 of Stallings).

A universal challenge with shared-medium communications techniques such as WLANs, is resolving contention and avoiding collisions on the communications medium. These techniques attempt to ensure that the shared communication medium is used as fully as possible while fairly allocating use of that medium's bandwidth by competing network devices. As noted by Stallings, above, the conventional approach has been to manage access to the physical communications medium using the MAC sub-layer (IEEE reference model) in the data link layer (OSI reference model), rather than in the physical layer.

The ongoing progress of technology presents special challenges in the area of contention resolution and collision avoidance. Higher transmission speeds place special demands on networks that must support both high-throughput (HT) devices and slower, legacy network devices that use conventional CSMA/CS. Especially in "mixed" WLAN environments (those including high-throughput and legacy devices), what worked acceptably in slower legacy devices is not acceptable in higher-throughput devices. In a WLAN environment, carrier sensing has been implemented using a mechanism called CCA (Clear Channel Assessment), which involves frame length detection through the PLCP layer (described below). Collision avoidance has been accomplished through use of a NAV (Network Allocation Vector) in the MAC layer to pre-reserve the transmission medium, using a data frame itself or an RTS/CTS frame. For higher throughput arrangements, however, using the lower speed NAV reservation process costs too much overhead: at higher data rates, the overhead of sending RTS/CTS frames and of inter-frame gaps is noticeably more burdensome than in lower speed networks. Accordingly, there is a need in the art to provide a lower-overhead arrangement for achieving collision avoidance.

Figure 1:
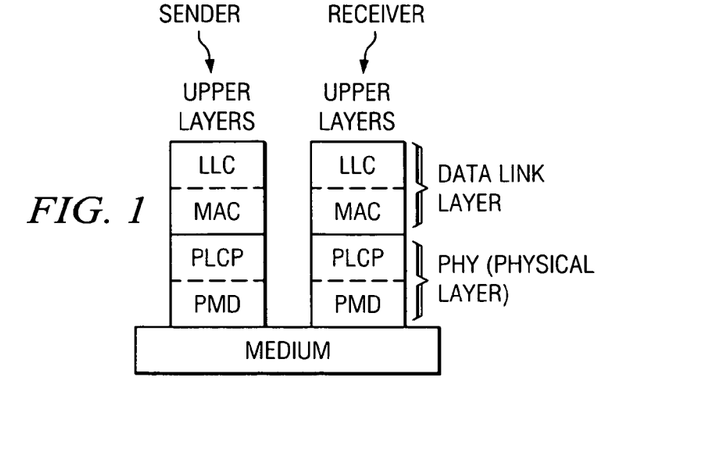
FIG. 1 illustrates protocol layer diagrams for the data link layer and physical layer in the IEEE 802 Reference Model.

FIG. 1 schematically illustrates a portion of the protocol layer models that embody sending and receiving network devices that are joined by a communications medium. Beneath the "upper layers" (that are not part of the IEEE 802 specification) are found the LLC and MAC sub-layers of the data link layer described above. Below the data link layer is the physical (PHY) layer, which includes a physical layer convergence protocol (PLCP) sub-layer and a physical medium dependent (PMD) sub-layer (see FIG. 11 of "ISO/IEC 8802-11/ANSI/IEEE Std 802.11" (1999)). In "IEEE Std 802.11a-1999, (Supplement to IEEE Std 802.11-1999)," Section 17.3.6 ("Clear channel assessment (CCA)") states that physical layer convergence protocol (PLCP) "shall provide the capability to perform CCA and report the result to the MAC. The CCA mechanism shall detect a 'medium busy' condition . . . "

Conventional arrangements for resolving contention and avoiding collisions have involved a clear channel assessment (CCA) period that is set to be the transmission time of a current packet. Accordingly, such conventional arrangements do not protect "follow-on" packets in the event of a "hidden terminal." In such scenarios, conventional arrangements must resort to transmitting additional protection frames in a backward compatible mode to attempt to protect the additional frames. Undesirably, the additional overhead of protection frames slows overall network throughput.

Accordingly, there is a need in the art for a way to fairly resolve contention and avoid collisions, especially in a "mixed" WLAN scenario in which high-throughput (HT) network devices must communicate with legacy devices over a shared communications medium.

SUMMARY

An arrangement avoids contention on a communication medium among devices including at least a transmitter and a receiver. The arrangement involves a first portion configured to instruct a receiver to indicate that the communication medium is busy for a time period substantially longer than an actual frame transmission period being sent from the transmitter to the receiver, and a second portion configured to prohibit the receiver from transmitting on the communication medium during the time period.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which:

FIGS. 70, 86, and 101 of the IEEE 802.11 (1999) specification);

FIG. 107 of IEEE 802.11a (1999));

DETAILED DESCRIPTION

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, implementation of new protocol layer elements, or integration with available protocol layer elements, may be only briefly mentioned or illustrated, their details being readily surmised by skilled artisans. Thus, the steps involved in methods or other arrangements described herein may be readily implemented by those skilled in the art without undue experimentation accordingly any detailed discussion thereof may be omitted.

Further, various aspects, features and embodiments of the presence arrangement may be described as a process that can be depicted as a protocol stack, a protocol layer diagram, a flowchart, a flow diagram, a structure diagram, a block diagram, and the like. Although these representations may describe the operations as ordered blocks or sequential process steps, many of the operations can be performed in parallel, concurrently, or in a different order or arrangement than that described. Operations not needed or desired for a particular implementation may be omitted. A process or its steps may correspond to a method, a function, a procedure, a subroutine, a subprogram, and so forth, or any combination thereof.

Briefly, the present embodiment involves a "virtual CCA" (virtual clear channel assessment, or VCCA) arrangement that instructs a receiving station (STA) to indicate that the medium is busy, for a time period that is longer than the receiving station would conventionally indicate it to be busy. Conventionally, a receiving station would indicate the medium to be busy only during a present packet duration; however, according to one embodiment, the receiving station is instructed to assert CCA for the entire duration of a whole frame exchange sequence, thus protecting frames (for example, 802.11n or frames from other high-throughput (HT) devices) from contention with frames from devices such as slower legacy devices.

The VCCA arrangement avoids the overhead of using separate protection frames, such as RTS/CTS (request to send, clear to send) frames, thus increasing overall network throughput. Essentially, virtual CCA overcomes the problems of increased overhead discussed in the Background, by embedding NAV information in the CCA mechanism. This embedding avoids the need for another layer of NAV protection mechanism, such as using RTS/CTS (Request To Send/Clear To Send) or self-addressed CTS as described in the 802.11g specification. In "mixed" networks of high-throughput and legacy network devices, the VCCA arrangement achieves fair contention resolution for legacy devices that might otherwise be lost.

Advantageously, one embodiment of the virtual CCA arrangement allows the CCA of a receiver to be updated during transmission of a frame that is not understood by the receiver except for the frame's preamble and physical layer convergence protocol (PLCP) header. Thus, a faster network device can instruct a slower, legacy network device to indicate a busy medium for a duration, called a "virtual CCA period," that is longer than the actual transmission duration of the current packet. During the Virtual CCA period, following the rule specified in IEEE 802.11, a legacy station shall not transmit. Accordingly, this arrangement protects subsequent packets from collision.

The VCCA arrangement allows pre-processing of packets at the physical layer (PHY), by specifying a virtual CCA period to cover an entire frame exchange period. This specification may be in the physical layer convergence protocol (PLCP) header. For example, in conjunction with Partial Address Filtering, the physical layer can make a decision to stop decoding in the middle of a frame, or can "sleep" during a frame period, thus avoiding the delay of moving such processing to a higher layer in the protocol stack.

Figure 2A:
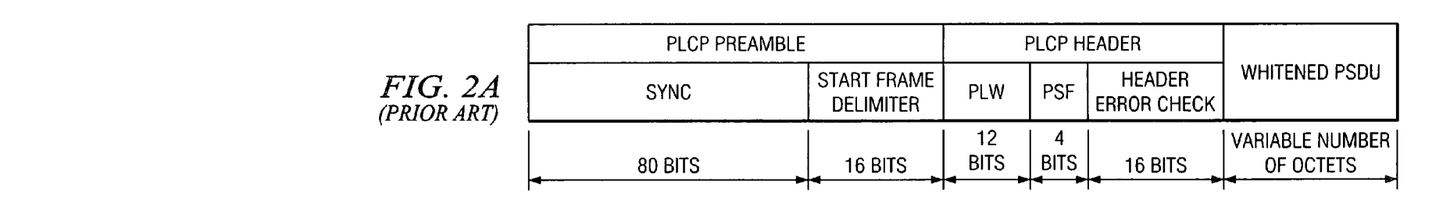
FIGS. 2A, 2B, and 2C are physical layer convergence protocol (PLCP) frame format diagrams for, respectively: frequency hopping spreading (FHSS), direct sequence spread spectrum (DSSS), and infrared physical layer specification (source.
Figure 2B:
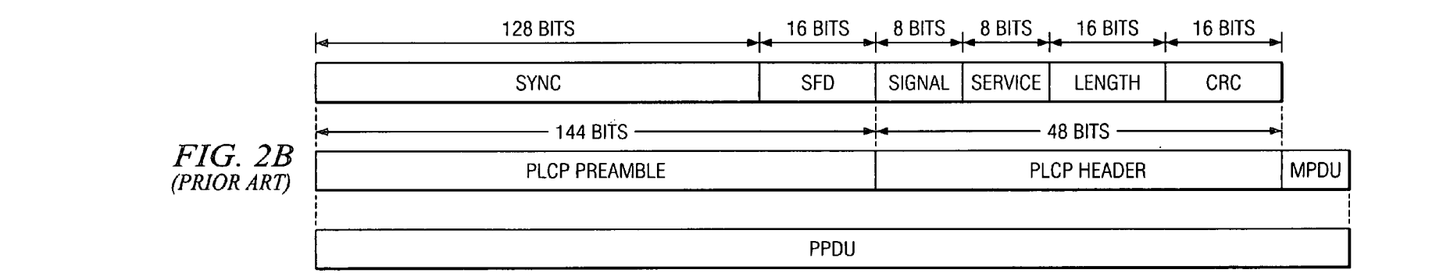
Figure 2C:
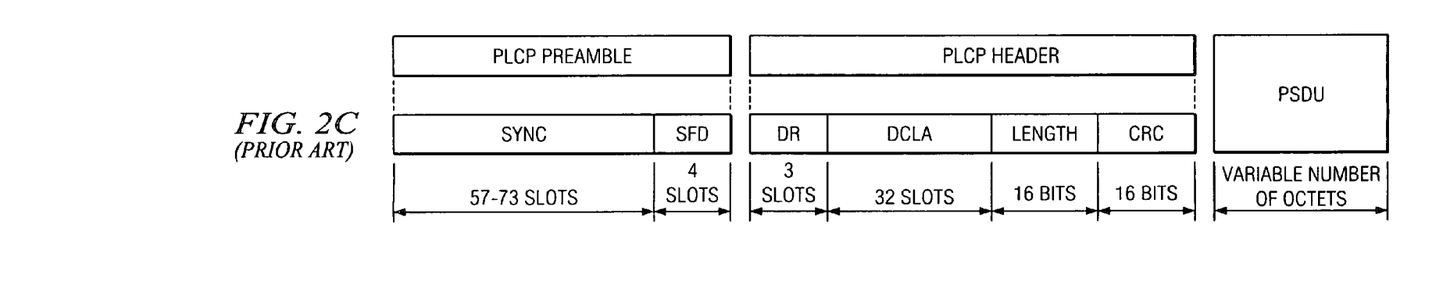
Figure 2D:
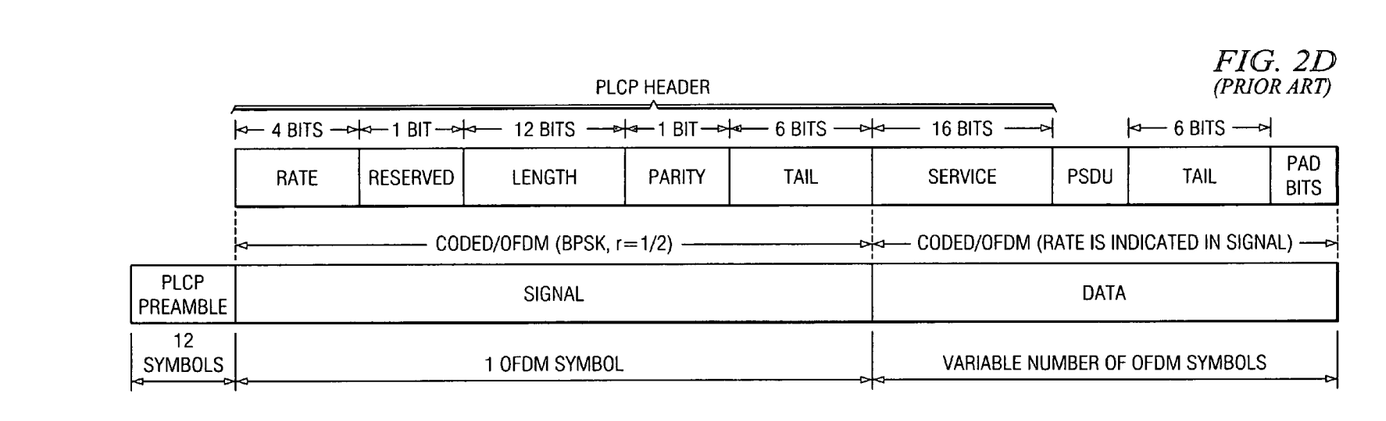
FIG. 2D is a frame format diagram of a physical layer convergence protocol (PLCP) protocol data unit (PPDU) frame (source.

FIGS. 2A, 2B, and 2C are physical layer convergence protocol (PLCP) frame format diagrams for, respectively: frequency hopping spreading (FHSS), direct sequence spread spectrum (DSSS), and infrared physical layer specification (source: FIGS. 70, 86, and 101 of the IEEE 802.11 (1999) specification); FIG. 2D is a frame format diagram of a physical layer convergence protocol (PLCP) protocol data unit (PPDU) frame (source: FIG. 107 of IEEE 802.11a (1999)).

Each illustrated PLCP frame has a PLCP preamble followed by a PLCP header. Being at the front of the frame, the preamble and header are encountered first by a receiver. Accordingly, any action that a receiver takes, based on the preamble or header, can be started before the end of the frame is encountered. This principle is used in the present VCCA arrangement, in that a sender's invocation of the VCCA arrangement can be initiated, even if a receiver cannot recognize or decode anything in the frame encountered after the header. In particular, if a receiver is a legacy receiver, it can take action based on the content of the header even if the ensuing data unit (PSDU, MPDU, DATA, etc.) is not compatible with the legacy receiver's demodulation and/or coding scheme.

Figure 3:
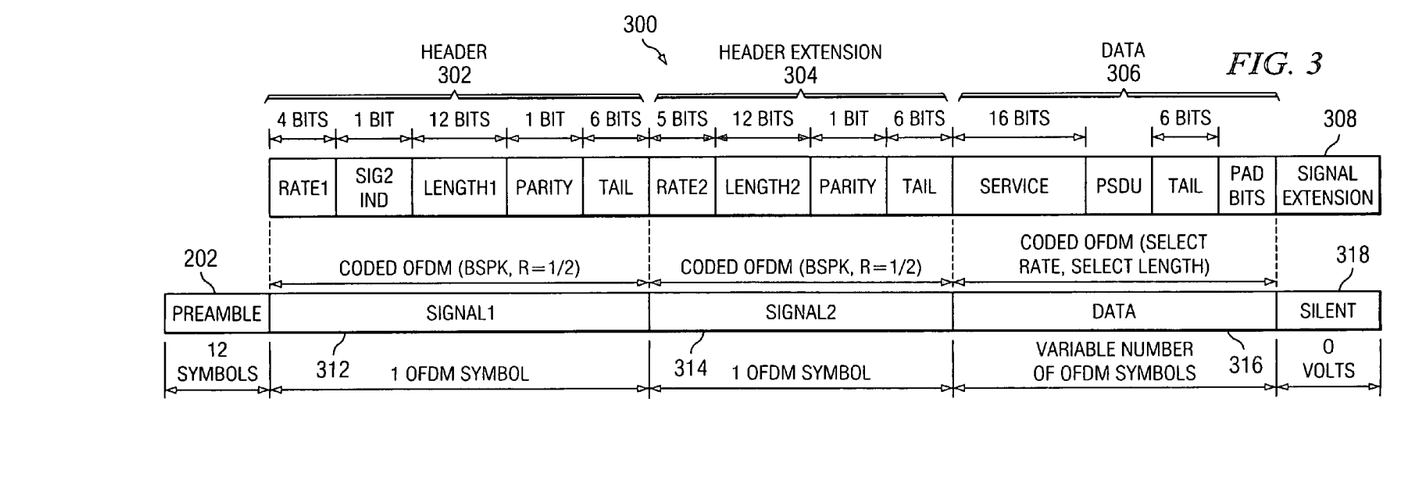
FIG. 3 shows one possible PLCP frame format diagram, showing SIGNAL1 and SIGNAL2 fields as may be used in embodiments of the present virtual clear channel avoidance (VCCA) arrangement, as may find application in an IEEE 802.11n PLCP header.

FIG. 3 is one example of a possible PLCP frame format diagram. Significantly, FIG. 3 shows SIGNAL1 and SIGNAL2 fields as may be used in embodiments of the present virtual clear channel avoidance (VCCA) arrangement. These plural fields, SIGNAL1 and SIGNAL2, contrast with the conventional formats of FIGS. 2A through 2D, in which only a single SIGNAL field is present.

FIG. 3 illustrates a data frame 300 in accordance with embodiments of the invention. In some embodiments, the data frame 300 may involve a modified PPDU (PLCP Protocol Data Unit) frame. As shown in FIG. 3, the data frame 300 may comprise a header 302 (e.g., a PLCP header), a header extension 304, and data 306 (e.g. PSDU (PLCP Service Data Unit) data). Preamble 202 and signal extension 308, 318 are discussed below. A MAC address frame (not shown) also may be included before or in the data frame 300.

The header 302 may comprise a single OFDM (Orthogonal Frequency Division Multiplexing) symbol 312 denoted as "SIGNAL" or, more specifically, as "SIGNAL1". In at least some embodiments, header 302 may define fictitious information for interpretation by devices that are not compatible with the header extension 304 or other parameters of a protocol. The SIGNAL1 symbol 312 may be transmitted at a rate of 6 Mbps using binary phase shift keying (BPSK) and a coding rate of ½.

In the example shown in FIG. 3, SIGNAL1 may comprise data from a "RATE1" field, a "SIG2 IND" field, a "LENGTH1" field, a "PARITY" filed, and a "TAIL" field. The RATE1 field may comprise 4 bits of data that identify a data rate having a fixed type of modulation (e.g., BPSK, QPSK, 16-QAM, 64-QAM) and/or a convolution coding rate (e.g., ½, ¾, ⅔).

The SIG2 IND field may comprise 1 bit of data that identifies whether the header extension 304 will be used (i.e., the SIG2 IND field may be used as a flag that indicates when the header extension 304 is used).

The LENGTH1 field may comprise 12 bits of data that identify a number of octets used for the data 306. The PARITY field may comprise 1 bit that identifies a positive parity bit for bits (0-16) of the header 302. The TAIL field may comprise 6 bits used to bring a convolutional encoder to a zero state.

The header extension 304 may be used when the SIG2 IND field bit of the header 302 is asserted (that is, equal to a logical "1").

As shown, the header extension 304 may comprise a single OFDM symbol 314 denoted as "SIGNAL2". In at least some embodiments, the header extension 304 may define information regarding parameters used by the second protocol and/or corrective information related to the fictitious information stored in the header 302. SIGNAL2 may be transmitted at a rate of 6 Mbps using BPSK and a coding rate of ½.

The header extension 304 may comprise a "RATE2" field, a "LENGTH2" field, a "PARITY" field, and a "TAIL" field. The RATE2 field may comprise 5 bits that define a data transfer rate of second protocol and a corresponding modulation type, coding rate and/or antenna configuration. For example, in some embodiments, the RATE2 field may encode a data transfer rate, a modulation type, a coding rate, and an antenna configuration according to Table 1.

TABLE 1

| RATE2 value (5 bits) | Modulation | Data Rate (Mbps) | Coding Rate | Antenna Configuration |
|---|---|---|---|---|
| 00000 | BPSK | 6 | 1/2 | STTD |
| 00000 | BPSK | 9 | 3/4 | STTD |
| 00000 | QPSK | 12 | 1/2 | STTD |
| 00000 | QPSK | 18 | 3/4 | STTD |
| 00000 | 16-QAM | 24 | 1/2 | STTD |
| 00000 | 16-QAM | 36 | 3/4 | STTD |
| 10001 | 16-QAM | 64 | 2/3 | VLST |
| 10000 | 16-QAM | 72 | 3/4 | VLST |
| 00001 | 64-QAM | 48 | 2/3 | STTD |
| 00000 | 64-QAM | 54 | 3/4 | STTD |
| 10001 | 64-QAM | 96 | 2/3 | VLST |
| 10000 | 64-QAM | 108 | 3/4 | VLST |
| 10010 | 64-QAM | 126 | 7/8 | VLST |
| 10110 | 64-QAM | 140 | 7/8 | VLST |

In at least some embodiments, the encoding for the RATE2 field bits (B0-B4) may be defined as follows. When the RATE2 field is "00000" the actual rate can be completely inferred from the RATE field in the header 302. In at least some embodiments, the bit "B4" may be a MIMO (Multiple Input Multiple Output) indication bit, wherein a "0" value indicates STTD (Space-Time Transmit Diversity) and a "1" value indicates VLST (Vertical BLAST). The bit "B3" may be defined as a channel bonding indicator bit, wherein a "1" value indicates that a channel bonding mechanism is used. Channel bonding means a channel bandwidth that is twice as big as single channel. The bit "B2" may be defined as a shortened guard interval indicator bit, wherein a "1" value indicates a shortened guard interval has been used (e.g., the interval guard may be shortened from 800 ns to 400 ns when a data rate of 140 Mbps is used). The bits "B1" and "B0" may be used to indicate a coding rate. For example, a "00" value may indicate the coding rate for RATE2 is same as the coding rate defined in the RATE field, a "01" value may indicate a ⅔ coding rate, a "10" value may indicate a ⅞ coding rate. In at least some embodiments, the RATE2 field also may contain information that defines a transmission antenna configuration.

The LENGTH2 field may comprise 12 bits. In some embodiments, the LENGTH2 field may be used when the total size of the data 306 exceeds 4095 octets (i.e., the maximum number of octets that may be described by the LENGTH field of the header 302). The PARITY field may comprise 1 bit that identifies a positive parity bit for bits (0-16) of the header extension 304. The TAIL field may comprise 6 bits (e.g. all "0s") used to bring a convolutional encoder to a zero state. In accordance with at least some embodiments, one or more header extensions 304 may be added to a data frame 300 to define different modulations, coding rates, antenna configurations, and/or data rate mappings.

The data 306 may comprise a "SERV" field, a "PSDU" field, a "TAIL" field, and a "PAD BITS" field. The SERV (i.e., service) field may comprise 16 bits used to synchronize a descrambler in a receiver (e.g., transceiver 104A, 104B). The PSDU field may comprise a variable amount of data. The TAIL field may comprise 6 bits used to bring a convolutional encoder to a zero state. The PAD BITS field may comprise a one or more bits (e.g., all "0s") that extend the length of the PSDU data 306 to be a multiple of the number of data bits per OFDM symbol (NDBPS). In at least some embodiments, $N_{DBPS}$ may be calculated as:

$$N_{DBPS} = (\text{Data Transfer Rate}) * (3.2 + T_{GI})$$

Here, the Data Transfer Rate may comprise a data rate defined by the RATE field or the RATE2 field, and the $T_{GI}$ value may comprise a time allocated for a guard interval (i.e., a time interval between symbols for reducing inter-symbol interference).

As shown in FIG. 3, the data frame 300 may further comprise a preamble 202 and a signal extension 308, 318. The preamble 202 may comprise a number of symbols (e.g., 12 symbols) that are used for synchronization and channel estimation. The signal extension 308, 310 may comprise a time period of silence (i.e., no data is transmitted) that provides a receiving system with additional time to decode the data 306 before receiving another data frame 300. For example, the signal extension time period may comprise approximately 4 μs.

Using data frame 300 with suitable data link layers and/or PHY layers allows devices of a wireless system to calculate the duration of data transfers in accordance with a first protocol or a second protocol.

In at least some embodiments, devices may create and interpret a data frame 300 as part of the second protocol. Additionally, the second protocol may permit the devices to interpret data frames that do not include the header extension 304. The device may create and interpret data frames that do not include the header extension 304 in accordance with a first protocol.

In at least some embodiments, the device is unaware of header extensions 304 and may interpret a header extension 304 as the first OFDM symbol in the data field 208. Therefore, when a first protocol device receives a second protocol data packet (e.g., data frame 300), the first protocol device may interpret the data packet up to and including the first header (which enables the first protocol device to determine the duration of the packet) and will attempt, but fail, to decode the remainder of the data packet.

Conventionally, legacy station set a CCA period $P_{CCA}$ according to Formula 1:

$$P_{CCA} = \frac{8 \cdot L_1}{R_1} \quad \text{(Formula 1)}$$

in which:

$L_1$ is the contents of the Length1 field, in octets, of SIGNAL (or SIGNAL1) in the PLCP header; and $R_1$ is the contents of the Rate1 field, in Mbps, of SIGNAL (or SIGNAL1) in the PLCP header.

Essentially, Formula 1 merely calculates the transmission time for the frame based on its length and rate information. During a CCA period, a legacy station shall not transmit; however, after the CCA is cleared, the legacy station still uses the extended inter-frame space (EIFS).

In contrast to conventional arrangements, a high-throughput (HT) station (presumably, distinguished from a legacy station) that intends to use the present Virtual CCA mechanism to protect a frame exchange sequence, may set a virtual CCA period $P_{VCCA}$ according to Formula 2:

$$P_{VCCA} = D + \frac{8L_2}{R_2} - EIFS + DIFS \quad \text{(Formula 2)}$$

in which:

D is the content of the Duration/ID field, in microseconds, in the frame header, as chosen from among those specified in IEEE 802.11 (1999);

$L_2$ is the actual length, in octets, of the packet being transmitted; and $R_2$ is the transmission rate, in Mbps, of the packet being transmitted;

EIFS is the extended inter-frame space (defined in IEEE 802.11 (1999)); and

DIFS is the distributed (coordination function) inter-frame space (also defined in IEEE 802.11 (1999)).

If the value of $P_{VCCA}$ is calculated to be less than 0.0, then the current packet is not transmitted using the high-throughput mode.

By thus setting the virtual CCA period, problems of conventional arrangements using dual SIGNAL fields in the PLCP header, are avoided. For example, the legacy station is not at an unfair disadvantage. In conventional arrangements, every frame overheard by the legacy station and transmitted using the Dual Signal (SIGNAL1, SIGNAL2) arrangement caused the legacy station to use EIFS.

Legacy stations never transmit SIGNAL1, SIGNAL2, because legacy stations only recognize a single SIGNAL field, such as that indicated in FIG. 2D. Thus, the SIGNAL1 field transmitted by an HT device can be understood by the legacy device; in contrast, the ensuing SIGNAL2 field cannot be understood by legacy devices.

Moreover, by using EIFS, the legacy station reset its network allocation vector (NAV) and voided any prior protection and may have damaged later packets. The present VCCA arrangement avoids these problems.

Because IEEE 802.11a limits a single frame to be under 4096 bytes, and assuming a 6 Mbps transmission rate, Formula 1 computes the maximum $P_{VCCA}$ to be 8*4096 bytes/6 Mbps=5461 μs, which is sufficiently long to cover most likely scenarios. Even if the calculated value of $P_{VCCA}$ is larger than 5461 μs, then either a protection mechanism may be employed, or multiple virtual CCA periods can be concatenated by means of multiple frames containing virtual CCA commands. Accordingly, a favored application scenario for using the present virtual CCA mechanism is for medium-duration packet exchange sequences in backward compatible mode. For extremely short sequences, legacy mode protection mechanisms can still be used; and for extremely long sequences, another protection mechanism and high-throughput transmission mode can be used.

Figure 4:
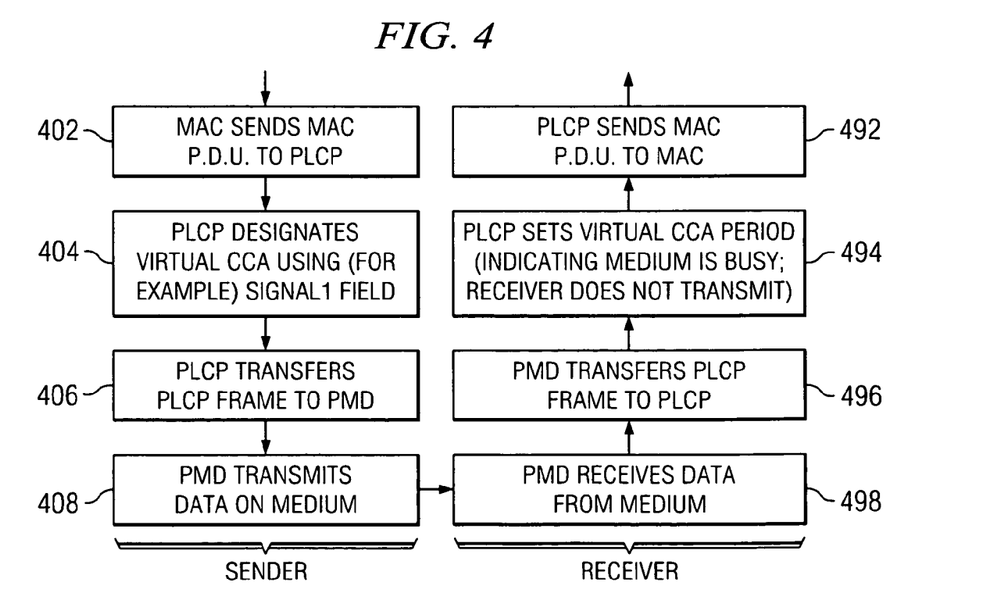
FIG. 4 illustrates an example of a method that may embody the present VCCA arrangement.

FIG. 4 illustrates an example of a method that may embody the present VCCA arrangement. Here, it is assumed that the sender is a high-throughput (HT) device that carries out blocks 402-408, and that the receiver is a slower legacy device that carries out blocks 492-498. Reference is again made to FIG. 1 for an understanding of the relation of the MAC, PLCP, and PMD sub-layers. It is assumed that the sender's MAC sub-layer has received an LLC PDU (protocol data unit) from the LLC sub-layer, and has formed a MAC protocol data unit (MPDU).

At the transmitting end, FIG. 4 block 402 indicates the MAC sub-layer's passing of the MPDU to the PLCP sub-layer.

Block 404 indicates the PLCP sub-layer's invocation of the virtual CCA (VCCA) mechanism. A high throughput (HT) sender uses Formula 2 to calculate $P_{VCCA}$ and uses the Formula 1=Formula 2 to calculate the values of LENGTH1 and RATE1 fields in SIGNAL1 of the PLCP header. Formula 2 represents the original CCA period+NAV (Network Allocation Vector) (same as D defined after Formula 2) originally carried in the MAC header to protect the packet sequence. Formula 1 is only used to calculate the CCA period. Setting Formula 1 equal to Formula 2 means using the conventional CCA calculation to accommodate the CCA+NAV in order to protect the legacy station from interference with the HT transmission. Setting Formula 1=Formula 2 to resolve a value for Length1 accomplishes this goal of protecting against interference.

Block 406 indicates the PLCP's transfer of a PLCP frame, including designations from block 404, to the PMD sub-layer.

Block 408 indicates the PMD sub-layer's transmission of framed data onto the communication medium.

At the receiving end, FIG. 4 block 498 indicates the receiver PMD sub-layer's reception of the framed data from the transmission medium.

Block 496 indicates the PMD sub-layer's transfer of the received frame to the PLCP sub-layer.

Block 494 indicates the PLCP sub-layer's obeying the sender's invocation of the VCCA mechanism (see block 404). If the sender explicitly designated $P_{VCCA}$ (using, for example, Formula 2), then the receiver would indicate the transmission medium to be busy during that time period, and refrain from transmitting. The receiver, if it is a legacy station, uses Formula 1 to calculate $P_{VCCA}$ based on SIGNAL1 and not on SIGNAL2, and refrains from transmitting during that calculated $P_{VCCA}$ period.

Block 492 indicates the PLCP sub-layer's passing of an MPDU to the receiver's MAC sub-layer, thus allowing the MAC sub-layer in turn to pass data units to the LLC sub-layer and higher layers.

Also provided, for the methods described herein, are computer program products (such as storage media) storing program instructions for execution on a computer system having at least one data processing device, which instructions when executed by the computer system cause the computer system to perform the methods described herein.

Further provided are systems for performing the methods described herein, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The arrangement provides at least one computer readable medium. Examples of computer readable media include compact discs, hard disks, floppy disks, tape, magneto optical disks, PROMs (for example, EPROM, EEPROM, Flash EPROM), DRAM, SRAM, SDRAM.

Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, networks, computer programs on recording media, and the like, are provided.

The present disclosure supports an arrangement for avoiding contention on a communication medium among devices including at least a transmitter and a receiver. The arrangement includes a first portion configured to instruct the receiver to indicate that the communication medium is busy for a time period substantially longer than an actual frame transmission period being sent from the transmitter to the receiver, and a second portion configured to prohibit the receiver from transmitting on the communication medium during the time period.

The first portion may be embodied in the transmitter, and the second portion may be embodied in the receiver.

The transmitter may have a much higher throughput capability than the receiver.

The first portion may constitute a field within a physical layer (PHY) protocol data unit (PDU), the field specifying a duration of the time period.

The first portion may include a designation in a SIGNAL1 field of a physical layer convergence protocol (PLCP) frame constituting the same frame that is being sent from the transmitter to the receiver.

Legacy receivers, having a slower throughput capability than a throughput capability of the transmitter, recognize the SIGNAL1 field but do not recognize a SIGNAL2 field.

The first portion may set the time period equal to a virtual clear channel assessment (VCCA) time period that equals a sum of a content of a Duration field in frame header of the frame being transmitted; eight times a quotient of an actual length, in octets, of the frame being transmitted, and a transmission rate, in Mbps, of the frame being transmitted; an extended inter frame space; and a distributed inter frame space.

The first portion in a given frame may be configured to include a length of a network allocation vector (NAV) configured to inherently perform a virtual carrier sense (VCS) function, thus avoiding a requirement of transmitting a separate additional frame to perform the VCS function.

The first portion in a given frame may be configured to include a length of a network allocation vector (NAV) plus a time needed to transmit the given frame's payload, to inherently perform a virtual carrier sense (VCS) function in a clear channel assessment (CCA) stage, thus avoiding a requirement of transmitting a separate additional frame to perform the VCS function The present disclosure also supports a method for avoiding contention on a communication medium by devices including at least a transmitter and a receiver. The method involves instructing a receiver to indicate that the communication medium is busy for a time period substantially longer than a frame being sent from the transmitter to the receiver, and prohibiting the receiver from transmitting on the communication medium during the time period.

The instructing step may include using a field within a physical layer (PHY) protocol data unit (PDU) to specify a duration of the time period.

The instructing step may include using a designation in a SIGNAL1 field of a physical layer convergence protocol (PLCP) frame constituting the same frame that is being sent from the transmitter to the receiver.

In legacy receivers having slower throughput capability than a throughput capability of the sender, the method may further involve recognizing the SIGNAL1 field without recognizing a SIGNAL2 field.

The instructing step may include a step of including, in a given frame, a length of a network allocation vector (NAV) configured to inherently perform a virtual carrier sense (VCS) function, thus avoiding a requirement of transmitting a separate additional frame to perform the VCS function.

The instructing step may include a step of including, in a given frame, a length of a network allocation vector (NAV) plus a time needed to transmit the given frame's payload, to inherently perform a virtual carrier sense (VCS) function in a clear channel assessment (CCA) stage, thus avoiding a requirement of transmitting a separate additional frame to perform the VCS function The present disclosure supports a network including a communication medium on which contention is to be avoided. The network may include a transmitting element, configured to transmit on the communication medium, a frame that includes an instruction that the communication medium is busy for a time period substantially longer than an actual transmission time of the frame that includes the instruction. The network may also include a receiving element, configured to receive the frame that includes the instruction, and, in response to the instruction, to refrain from transmitting on the communication medium during the time period, so as to avoid the contention on the communication medium.

The transmitting element may have a much higher throughput capability than the receiving element.

The communication medium may be a wireless communication medium.

The instruction may be a designation in a SIGNAL1 field of a physical layer convergence protocol (PLCP) frame constituting the same frame that is transmitted from the transmitting element to the receiving element, the SIGNAL1 field defining parameters associated with a particular communications protocol that is one of plural distinct communications protocols operating on the network.

The instruction may include a length of a network allocation vector (NAV) configured to inherently perform a virtual carrier sense (VCS) function, thus avoiding a requirement of transmitting a separate additional frame to perform the VCS function.

Many alternatives, modifications, and variations will be apparent to those skilled in the art in light of the above teachings. For example, varying the content, size, order and arrangement of fields within a frame format, lies within the scope of the present invention. Further, varying the design of how the fields cause a communication system to operate, also lies within the contemplation of the invention. It is therefore to be understood that within the scope of the appended claims and their equivalents, the invention may be practiced otherwise than as specifically described herein.

What is claimed is:

1. A system comprising:
a high-throughput (HT) device configured to invoke a virtual clear channel assessment (VCCA) mechanism and set a virtual clear channel assessment (VCCA) time period equaling a sum of:
   a content of a Duration field in frame header of the frame being transmitted;
   eight times a quotient of an actual length, in octets, of the frame being transmitted, and a transmission rate, in Mbps, of the frame being transmitted;
   an extended inter frame space; and
   a distributed inter frame space;
a receiving station (STA) configured to receive an indicate that the communication medium is busy for a time period equal to the virtual clear channel assessment (VCCA) time period longer than an actual frame transmission period being sent from the transmitter to the receiver; and
wherein the receiving station (STA) is further configured to refrain from transmitting on the communication medium during the time period.

2. The system of claim 1, wherein:
the first a physical layer (PHY) device configuration includes a length of a network allocation vector (NAV) configured to inherently perform a virtual carrier sense (VCS) function, thus avoiding a requirement of transmitting a separate additional frame to perform the VCS function.

3. The system of claim 1, wherein:
the high-throughput (HT) device configuration includes a length of a network allocation vector (NAV) plus a time needed to transmit the given frame's payload, to inherently perform a virtual carrier sense (VCS) function in a clear channel assessment (CCA) stage, thus avoiding a requirement of transmitting a separate additional frame to perform the VCS function.

4. The system of claim 1, wherein:
the high-throughput (HT) device has a much higher throughput capability than the receiving station (STA).

5. The system of claim 1, wherein:
the high-throughput (HT) device includes a designation in a SIGNAL1 field of a physical layer convergence protocol (PLCP) frame constituting the same frame that is being sent from the high-throughput (HT) device to the receiving station (STA).

6. The system of claim 5, wherein:
legacy receivers, having a slower throughput capability than a throughput capability of the transmitter, recognize the SIGNAL1 field but do not recognize a SIGNAL2 field.

7. A method for avoiding contention on a communication medium by devices including at least a transmitter and a receiver, the method comprising:
setting a time period equal to a virtual clear channel assessment (VCCA) time period equaling a sum of:
   a content of a Duration field in frame header of the frame being transmitted;

eight times a quotient of an actual length, in octets, of the frame being transmitted, and a transmission rate, in Mbps, of the frame being transmitted;
an extended inter frame space; and
a distributed inter frame space;
instructing a receiver to indicate that the communication medium is busy for the time period longer than a frame being sent from the transmitter to the receiver; and
prohibiting the receiver from transmitting on the communication medium during the time period.

8. The method of claim 7, wherein the instructing step includes:
using a field within a physical layer (PHY) protocol data unit (PDU) to specify a duration of the time period.

9. The method of claim 7, wherein the instructing step includes:
using a designation in a SIGNAL1 field of a physical layer convergence protocol (PLCP) frame constituting the same frame that is being sent from the transmitter to the receiver.

10. The method of claim 9, further comprising:
in legacy receivers having slower throughput capability than a throughput capability of the sender, recognizing the SIGNAL1 field without recognizing a SIGNAL2 field.

11. The method of claim 7, wherein the instructing step includes:
including, in a given frame, a length of a network allocation vector (NAV) configured to inherently perform a virtual carrier sense (VCS) function, thus avoiding a requirement of transmitting a separate additional frame to perform the VCS function.

12. The method of claim 7, wherein the instructing step includes:
including, in a given frame, a length of a network allocation vector (NAV) plus a time needed to transmit the given frame's payload, to inherently perform a virtual carrier sense (VCS) function in a clear channel assessment (CCA) stage, thus avoiding a requirement of transmitting a separate additional frame to perform the VCS function.

13. A network including a communication medium on which contention is to be avoided, the network comprising:
a transmitting element, configured to transmit on the communication medium, a frame that includes an instruction that the communication medium is busy for a time period equal to a virtual clear channel assessment (VCCA) time period longer than an actual transmission time of the frame that includes the instruction equaling a sum of:
a content of a Duration field in frame header of the frame being transmitted;
eight times a quotient of an actual length, in octets, of the frame being transmitted, and a transmission rate, in Mbps, of the frame being transmitted;
an extended inter frame space; and
a distributed inter frame space; and
a receiving element, configured to receive the frame that includes the instruction, and, in response to the instruction, to refrain from transmitting on the communication medium during the time period, so as to avoid the contention on the communication medium.

14. The network of claim 13, wherein:
the transmitting element has a much higher throughput capability than the receiving element.

15. The network of claim 13, wherein:
the communication medium is a wireless communication medium.

16. The network of claim 13 wherein:
the instruction is a designation in a SIGNAL1 field of a physical layer convergence protocol (PLCP) frame constituting the same frame that is transmitted from the transmitting element to the receiving element, the SIGNAL1 field defining parameters associated with a particular communications protocol that is one of plural distinct communications protocols operating on the network.

17. The network of claim 13, wherein:
the instruction includes a length of a network allocation vector (NAV) configured to inherently perform a virtual carrier sense (VCS) function, thus avoiding a requirement of transmitting a separate additional frame to perform the VCS function.

* * * * *